July 28, 1931.    J. R. KINNEY    1,816,048
ANTIGLARE DEVICE FOR MOTOR CARS
Filed Jan. 24, 1929
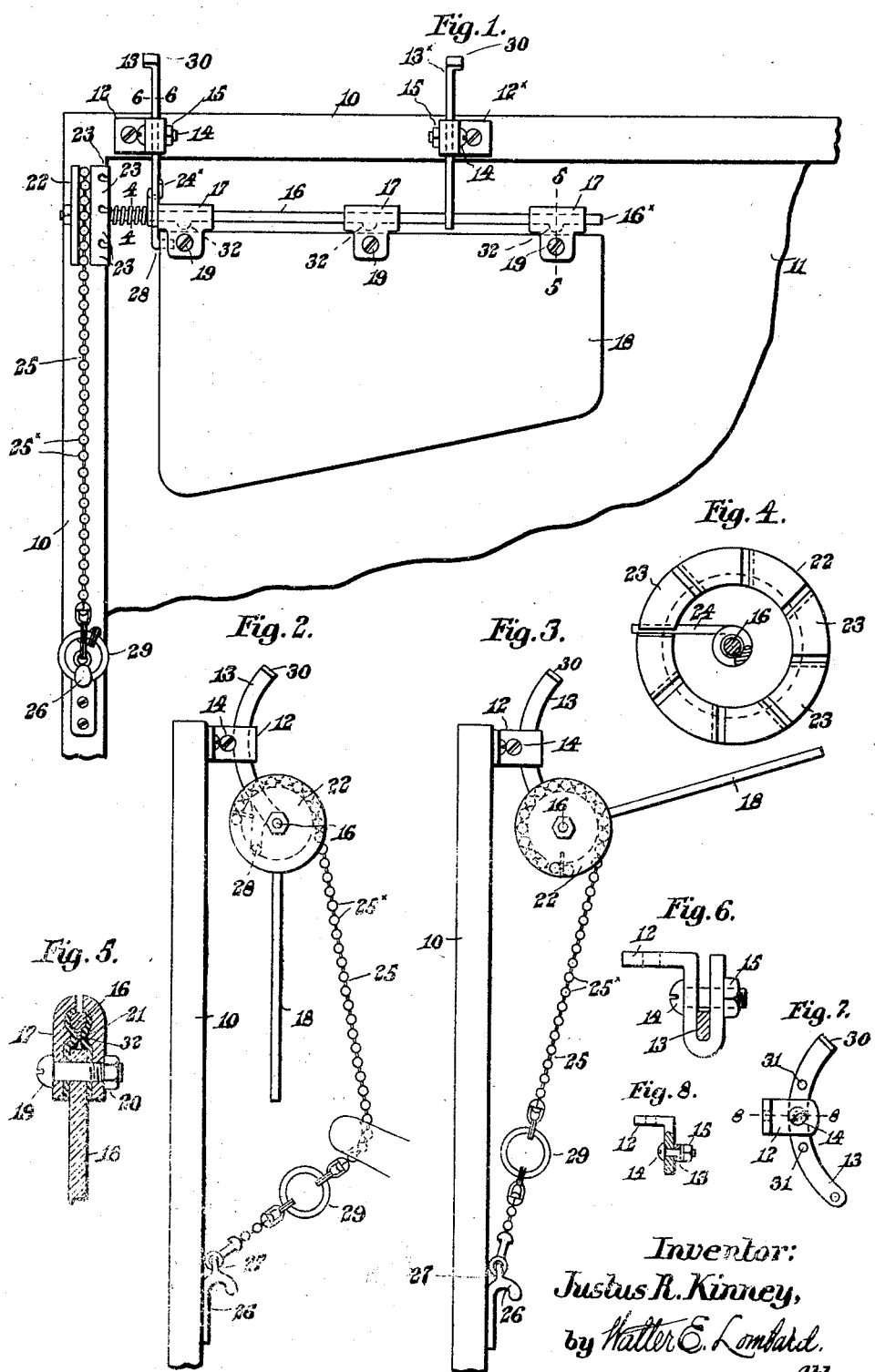
Inventor:
Justus R. Kinney,
by Walter E. Lombard
Atty.

Patented July 28, 1931

1,816,048

UNITED STATES PATENT OFFICE

JUSTUS R. KINNEY, OF JAMAICA PLAIN, MASSACHUSETTS

ANTIGLARE DEVICE FOR MOTOR CARS

Application filed January 24, 1929. Serial No. 334,661.

This invention relates to anti-glare devices for motor cars and has for its object the production of a device of this character which may be adjusted readily to accommodate it to any make of motor vehicle and which may be actuated quickly by the car driver when a car approaches with blinding headlights, means being provided to return the parts thereof to their normal position as soon as the car has passed.

This object is attained by the mechanism illustrated in the accompanying drawings.

For the purpose of illustrating the invention, one preferred form thereof is illustrated in the drawings, this form having been found to give satisfactory and reliable results, although it is to be understood that the various instrumentalities of which the invention consists can be variously arranged and organized, and the invention is not limited to the precise arrangement and organization of these instrumentalities as herein shown and described except as required by the scope of the appended claims.

Of the drawings:

Figure 1 represents a front elevation of an anti-glare device embodying the principles of the present invention.

Figure 2 represents a side elevation of the same with the window in position for use.

Figure 3 represents a side elevation of the same with the window in raised position.

Figure 4 represents a section on line 4, 4, on Fig. 1.

Figure 5 represents a section on line 5, 5, on Fig. 1.

Figure 6 represents a section through one of the supporting bars and the bracket therefor on line 6, 6, on Fig. 1.

Figure 7 represents an elevation of a modified form of bracket and the adjustable arm support thereof, and Figure 8 represents a section on line 8, 8, on Fig. 7.

Figures 4 and 5 are drawn to an enlarged scale.

Similar characters indicate like parts throughout the several figures of the drawings.

In the drawings, 10 is the frame of a windshield of a motor car having a glass 11 therein.

To the upper bar of the windshield are secured brackets 12, 12x.

Disposed in the bracket 12 is an arm 13 and in the bracket 12x is an arm 13x, each of these arms being curved as indicated in Figs. 2 and 3 of the drawings.

Each bracket 12, 12x is provided with a clamping bolt 14 and nut 15 by which the arm 13 or 13x may be clamped readily in adjusted position.

By means of the curvature of the arms 13, 13x, these arms may be adjusted in bearings 12, 12x so that the lower ends thereof may be located in different positions relative to the windshield.

This adjustment is necessary in order to make provision for mounting the device on various types of cars, some cars having different devices extending from the rear of the windshield and therefore it is essential that in some cars the bearings in the lower ends of the arms must be located at greater distances from the windshield than in other types of cars.

The lower ends of the arms 13, 13x are provided with bearings in which is disposed a shaft 16.

By having the arms 13, 13x curved, these arms may be adjusted without raising or lowering the bearings thereof to any great extent.

The shaft 16 has clamped thereto the clips 17 secured to the upper edge of a colored window 18 by means of bolts 19 and nuts 20.

These clips 17 have on their inner faces layers of resilient material 21 bearing against the window 18 and also around the shaft 16.

By turning the nuts 20 upon the bolts 19 the clips 17 may be clamped securely to the shaft 16 so that when said shaft oscillates the window 18 will be carried therewith.

One of these clips 17 is located at each end of the window 18 while another clip 17 is disposed midway thereof.

This makes it possible for the bracket 12x and arm 13x to be mounted upon the frame 10 at any point between the two right hand clips 17, 17, or if necessary, the arm 13x may be located in such a position as to receive the projecting end 16x of the shaft 16.

This arrangement whereby the supporting arm 13x may be positioned at various points on the windshield is of great advantage as it provides a means whereby the same anti-glare device may be mounted on various types of cars.

To the left end of the shaft 16 is secured a pulley 22 having formed integral with one face thereof a plurality of projections 23 between which one end of a helical spring 24 may be disposed.

This spring 24 is coiled about the shaft 16 and has its opposite end 24x disposed beneath and in contact with the arm 13.

The tension of the spring 24 is such as to raise the window 18 into an elevated position under normal conditions.

Secured to the pulley 22 is a pulling element 25 made up in part of a plurality of smooth balls 25x which may be readily seized by the hand without causing any injury or discomfort thereto.

To a side bar of the frame 10 is secured a hook 26 having an eye 27 to which the lower end of the pulling member 25 is secured as indicated in Figs. 2 and 3 of the drawings.

The normal position of the window 18 is as shown in Fig. 3 of the drawings, said window being elevated and opposite the upper part of the windshield so as not to interfere with the view of the driver.

When a car approaches with blinding headlights, the operator reaches out and with a finger seizes the pulling member 25 and moves it into position indicated in Fig. 2 of the drawings, thus lowering the window 18 into a vertical position parallel with the windshield glass 11.

The arm 13 is provided at its lower end with a stop member 28 against which the window 18 is adapted to contact, thus limiting its movement towards the glass 11 and effectually preventing any contact therewith.

The pulling member 25 is also provided with a ring 29 which is adapted to be placed over the hook 26 when it is desired to retain the window in its vertical position for some time.

This occurs when at night time there is approaching a continuous line of cars having glaring headlights, or when in day light the sun has a tendency to blind the driver of the car.

At night time very often a single car approaches with blinding headlights and the pulling member 25 is actuated to lower the window 18 for a very short time and when released the spring 24 will immediately return the window to its normal position, as indicated in Fig. 3.

When this pulling member 25 becomes slack, the end of the spring 24 may be changed into other positions between the projections 23 on the pulley 22, thus increasing the tension of the spring 24 and causing the pulling member 25 to be kept taut.

While the brackets 12, 12x are shown secured to the frame 10 of the windshield, it is quite obvious that they may be secured to some other part of the car above said windshield without affecting the scope of the invention.

Likewise the hook 26 may be secured to some other fixed point on the car if desired, as it is not essential that it should be attached to the windshield frame 10 as shown in the drawings.

The window 18 may be of celluloid, glass or any other desired transparent material provided the color is of such a character as to deaden the glare of the headlights of an approaching car while permitting full view of all objects in front of the car equipped with the invention.

The pulling member 25 is positioned in such a manner that it may be seized readily by a finger of the left hand of the driver without necessitating the driver removing the hand from the steering wheel.

At the upper end of the arms 13, 13x are lateral flanges 30 which prevent the arms from being accidentally displaced from the brackets 12, 12x when the clamping members 14, 15 are loosened.

The arms 13, 13x may, if desired, be provided with holes 31, as shown in Figs. 7 and 8, through which the clamping bolts 14 extend.

When this style of arm is used, said arms may be adjusted about the axes of bolts 14 and then clamped in adjusted position.

When greater or lesser adjustment is required the bolts may be inserted in the upper or lower holes 31 respectively.

The shaft 16 is provided with radial ears 32 one of which projects into each clip 17 as shown in Figs. 1 and 5, thereby providing means whereby the window 18 will be moved about the axis of said shaft 16 whenever said shaft is oscillated.

When in its normal position the window 18 is inclined upwardly to the rear of the windshield from the axis of shaft 16 to the rear of the windshield with its outer end near the top of the car and at a level higher than the operator's head.

In this position, if the operator is suddenly thrown forward, his head will pass under the window 18 and not against the edge thereof as might be the case if the window was in a lower position.

This makes a very inexpensive form of mechanism which is so constructed that the various parts may be adjusted readily to permit of the installation of the device on most any type of motor car without disturbing the various elements which are already located upon or adjacent to the windshield.

It is believed that the operation and many advantages of the invention will be understood without further description.

Having thus described my invention, I claim:

1. The combination with a windshield, a pair of supporting arms having bearings therein; a shaft adapted to oscillate in said bearings; a colored window; clips secured to the upper edge of said window at opposite ends and midway thereof; means for clamping said clips to said shaft; a spring coacting with said shaft to retain the window in its upper position under normal conditions; means for varying the tension of said spring; and a pulling member for oscillating said shaft and moving said window into vertical position.

2. The combination with a windshield, a supported pivoted shaft; a colored window secured thereto and movable therewith; a pulley secured to one end of said shaft; a helical spring surrounding said shaft and coacting with said pulley to retain said window normally in its upper position; means for changing the connection between said pulley and spring to regulate the tension of the latter; and a pulling member secured to said pulley whereby said window may be moved into vertical position.

3. The combination with a windshield, a supported pivoted shaft; a colored window secured thereto and movable therewith; a pulley secured to one end of said shaft having a plurality of projections on one face thereof; a helical spring surrounding said shaft and coacting with the projections on said pulley to retain said window normally in its upper position; and a pulley member secured to said pulley whereby said window may be moved into vertical position.

4. The combination with a windshield, a supported pivoted shaft; a colored window secured thereto and movable therewith; a pulley secured to one end of said shaft having a plurality of integral projections on one face thereof; a helical spring surrounding said shaft and coacting with the projections on said pulley to retain said window normally in its upper position; and a pulley member secured to said pulley whereby said window may be moved into vertical position.

5. The combination with a windshield; fixed U-shaped brackets; a single arm between the walls of each bracket and adjustable endwise relatively thereto; means for clamping said arms to said brackets in adjusted position; a shaft adapted to oscillate in bearings in said arms; a colored window secured to said shaft; spring mechanism for retaining said window in upwardly inclined position under normal conditions; a member secured to and movable with said shaft; and means secured to said shaft member for moving said window into vertical position parallel with said windshield.

6. The combination with a windshield, a pair of supporting arms having bearings therein; a shaft adapted to oscillate in said bearings and having ears extending radially therefrom; a transparent frameless colored window; a plurality of pairs of oppositely disposed clips secured to the upper edge of said window opposite said ears; means for clamping each pair of clips to said shaft and ears; spring mechanism coacting with said shaft to retain the window in its upper position under normal conditions; a member secured to and movable with said shaft; and a pulling member secured to said shaft member for oscillating said shaft and moving said window into vertical position.

Signed by me at 294 Washington St., Boston, Mass., this 18th day of January, 1929.

JUSTUS R. KINNEY.